United States Patent [19]

Huvet

[11] Patent Number: 4,502,087

[45] Date of Patent: Feb. 26, 1985

[54] SURGE VOLTAGE ARRESTER ASSEMBLY

[75] Inventor: Jean-Marie Huvet, Rilly la Montagne, France

[73] Assignee: GTE Products Corporation, Stamford, Conn.

[21] Appl. No.: 651,656

[22] Filed: Sep. 17, 1984

Related U.S. Application Data

[63] Continuation of Ser. No. 433,498, Oct. 8, 1982, abandoned.

[30] Foreign Application Priority Data

Jul. 20, 1982 [FR] France ................................ 82 12667

[51] Int. Cl.$^{3}$ ................................................ H02H 9/06

[52] U.S. Cl. ..................................... 361/119; 361/120; 361/124

[58] Field of Search ........................ 361/119, 120, 124; 313/324

[56] References Cited

U.S. PATENT DOCUMENTS

| | | | |
|---|---|---|---|
| 3,755,715 | 8/1973 | Klayum et al. | 361/120 |
| 4,132,915 | 1/1979 | Wilms | 313/325 |
| 4,158,869 | 6/1979 | Gilberts | 361/119 X |
| 4,320,435 | 3/1982 | Jones | 361/120 X |
| 4,327,393 | 4/1982 | Hines et al. | 361/119 |
| 4,366,412 | 12/1982 | Lange et al. | 361/120 X |
| 4,405,967 | 9/1983 | Cwirzen | 361/124 |

*Primary Examiner*—Harry E. Moose, Jr.
*Attorney, Agent, or Firm*—Thomas H. Buffton

[57] ABSTRACT

A surge voltage arrester assembly includes a threaded tubular housing member coupled to circuit ground and including therein an axially aligned compression spring, metallic cage with extending resilient fingers, a solder pellet, a gas-filled tube having a primary arc gap and insulator means with secondary arc gap holes separating a pair of electrically conductive members contacting the gas-filled tube and metallic cage respectively.

8 Claims, 3 Drawing Figures

SURGE VOLTAGE ARRESTER ASSEMBLY

This application is a continuation of application Ser. No. 433,498, filed Oct. 8,1982 now abandoned. su

TECHNICAL FIELD

This invention relates to surge voltage arrester assemblies for protecting telephone and communication lines from over-voltages and excess current conditions, and more particularly to enhanced surge voltage arrester assemblies having improved "back-up" or secondary surge features for protecting auxiliary apparatus.

BACKGROUND ART

It is known to provide line protectors or surge voltage arrester assemblies wherein is included a cold cathode gas discharge tube which includes a pair of electrodes spaced by a tubular insulator and containing an arc gap with a surrounding gas atmosphere. It is also known that such gas tubes sometimes fail, and such failure is most difficult to detect because the electrical circuitry connected thereto continues to operate in a normal manner. Thus, it is prudent to provide a "back-up" or redundant spark gap system since a broken seal or similar failure of a sealed arc gap tube is not readily detectable but does alter the arcing characteristics of the apparatus.

One known form of added protection is set forth in U.S. Pat. No. 3,755,715, issued Aug. 28, 1973. Therein, a meltable pellet is positioned to respond to excessive current by melting and short-circuiting the line to circuit ground. Unfortunately, such meltable circuitry is not responsive to excess currents and voltages applied for relatively short periods of time. Attempts to obviate such relatively slow responsive capabilities are set forth in U.S. Pat. No. 4,241,374, issued Dec. 23, 1970, and U.S. Pat. No. 4,208,694, issued June 17, 1980. Therein, an additional arc gap is provided by adding a metallic cup having an off-set portion spaced from one electrode of the gas tube by an insulator material. Also, O-rings and sealing compounds are utilized in attempts to isolate the arc gap from undesired ambient conditions and contaminents. Thus, the complexity and cost of both the structure and the assembly is undesirably increased.

OBJECTS AND SUMMARY OF THE INVENTION

Therefore, it is an object of the present invention to provide an improved surge voltage arrester assembly. Another object of the invention is to provide a surge voltage arrester assembly having an improved arc gap capability. Still another object of the invention is to provide an improved spark gap redundancy in a surge voltage arrester assembly. A further object of the invention is to provide a surge voltage arrester assembly having an improved arc gap capability and a reduced component complexity and cost.

These and other objects, advantages and capabilities are achieved in one aspect of the invention by a surge voltage arrester assembly wherein a cage having resilient fingers and containing a sealed cold cathode gas tube with a primary arc gap is slideably positioned within a metallic tubular housing member. First and second electrically conductive members separated by an insulator having a plurality of holes forming secondary arc gaps are positioned to contact the gas tube and the resilient fingers, respectively, to provide parallel connected primary and secondary arc gaps, with the arc gaps isolated from ambient conditions and contaminents.

BEST MODE FOR CARRYING OUT THE INVENTION

For a better understanding of the present invention, together with other and further objects, advantages and capabilities thereof, reference is made to the following disclosure and appended claims in conjunction with the accompanying drawings.

Figure 1:
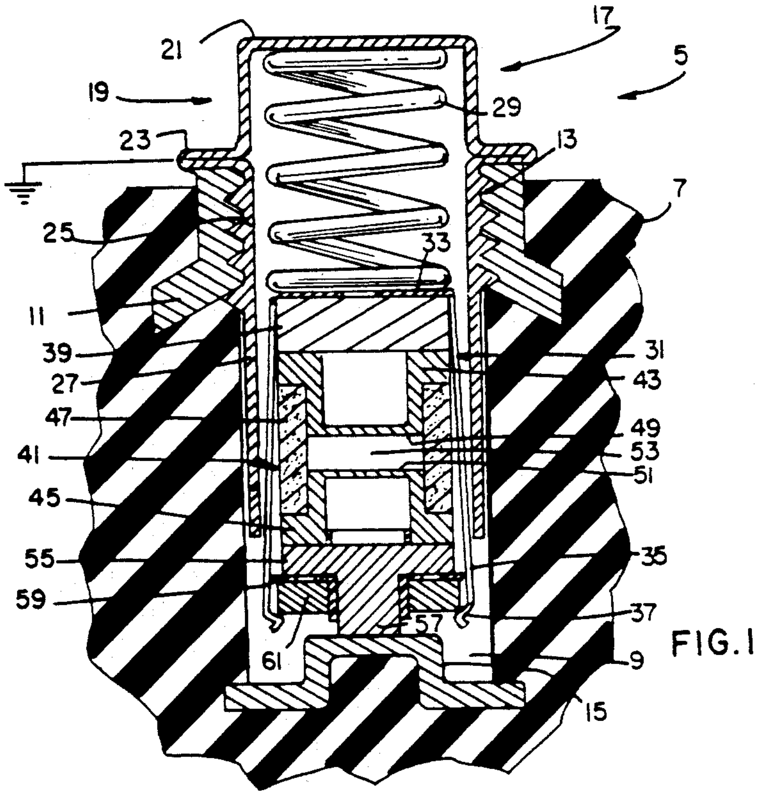
FIG. 1 is a cross-sectional view of a preferred form of surge voltage arrester assembly of the invention.

Referring to FIG. 1 of the drawings, a line protection installation system 5 includes a block of dielectric material 7 having a cylindrical hole 9. A metallic member 11 is embedded into the block 7 and includes an internal threaded portion 13 which is normally connected to circuit ground. Also, a metallic contact member 15 is located at the bottom of the cylindrical hole 9 and serves to provide electrical contact to associated electric apparatus (not shown).

Associated with the line protection installation system 5 is a surge voltage arrester assembly 17 which includes a metallic tubular housing member 19 having a cup-shaped base portion 21 extending to an outwardly extending flanged portion 23. An externally threaded portion 25 of the housing member 19 is located immediately adjacent the flanged portion 23 and is connected to an outwardly extending wall member 27.

Coaxially mounted within the tubular housing member 19 is a compression spring 29 which has one end thereof bearing against the internal surface of the cup-shaped base portion 21. An electrically conductive metallic cage member 31 includes a circular planar contact portion 33 with outwardly extending circumferentially spaced resilient fingers 35 having arcuate end portions 37. The cage member 31 is slideably positioned within the wall member 27 of the housing member 19 in a manner to provide contact of the circular planar portion 33 with the compression spring 29. Also, the wall member 27 exerts a compressive force upon the resilient fingers 35 in an amount such that a portion of the resilient fingers 35 extends outwardly of the wall member 27 of the housing member 19.

Disposed within and contacting the circular planar portion 33 of the metallic cage member 31 is a solder pellet 39. Immediately adjacent to and in contact with the solder pellet 39 is a sealed cold cathode gas tube 41. The gas tube 41 includes oppositely disposed first and second electrodes, 43 and 45 respectively, separated by a tubular ceramic insulator 47 to which the first and second electrodes 43 and 45 are hermetically sealed by brazing, soldering or any well known technique. The electrodes 43 and 45 extend inwardly of the ceramic insulator 47 and include a pair of spaced planar surfaces, 49 and 51 respectively, forming a primary arc gap 53 located within a gaseous atmosphere.

The sealed cold cathode gas tube 41 is positioned within the cage member 31 with the first electrode 43 in contact with the solder pellet 39. At the opposite end of the gas tube 41, the second electrode 45 is contacted by a first substantially circular electrically conductive member 55 having an axially extending cylinder or protuberence 57 formed for contact with the contact member 15 of the line protection system 5. An insulator means 59 is disposed intermediate the first conductive member 55 and a second electrically conductive member 61. Moreover, the second conductive member 61 is in contact with and positionally retained by the arcuate end portions 37 of the resilient fingers 35 of the metallic cage 31.

Figure 2:
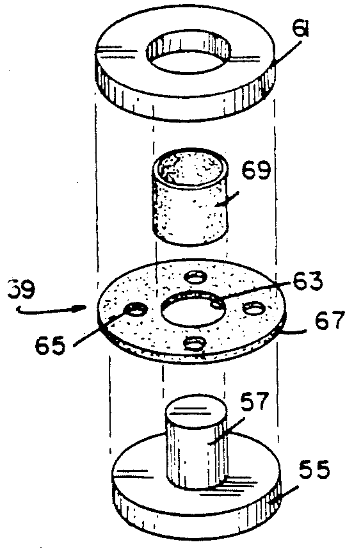
FIG. 2 is an enlarged fragmentary exploded view of the insulator means of FIG. 1 illustating one form of arc gap formation.

As can more readily be seen in the exploded view of FIG. 2, the insulator means 59 electrically isolates the first and second conductive members, 55 and 61 respectively, from one another and includes a central aperture 63 as well as a plurality of circumferentially spaced holes 65. These spaced holes 65 provide air gaps which serve as a plurality of secondary arc gaps intermediate the first and second conductive members 55 and 61.

More specifically, the embodiment of FIG. 2 illustrates an insulator means 59 in the form of a wafer 67 of insulating material, e.g., of a plastic such as mylar, having a thickness of about 0.008 to 0.010 inch. This wafer 67 has a central aperature 63 formed to telescope over the axially extending protuberance 57 of the circular conductive member 55. The wafer 67 includes the previously-mentioned holes 65 which serve as secondary arc gaps, and a sleeve of insulating material 69 is also telescoped over the protuberance 57 for electrically isolating the first and second conductive members 55 and 61 from one another.

Figure 3:
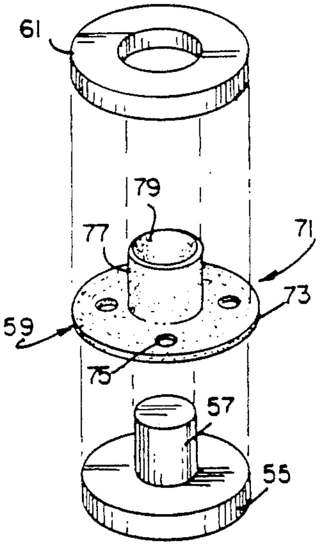
FIG. 3 is an enlarged fragmentary exploded view of the insulator means of FIG. 1 showing an alternate form of arc gap formation.

Alternatively, the insulator means 59 of FIG. 3 may be in the form of an insulating material structure 71 having a substantially planar portion 73 with a plurality of circumferentially spaced holes 75 and an upstanding portion 77 with a central aperture 79. In a manner similar to the embodiment of FIG. 2, the insulating means 59 electrically separates the first and second conductive members 55 and 61, and the holes 75 serve as the secondary arc gaps therebetween. Thus, the air gaps forming these secondary arc gaps are, for all practical purposes, isolated from undesired ambient contaminents and conditions.

As to operation, it can readily be seen that the gas tube primary arc gap 53 and the secondary arc gaps intermediate the first and second conductive members 55 and 61 are parallel connected intermediate the contact member 15 connected to a line potential and the housing member 19 connected to circuit ground. The secondary arc gaps intermediate the first and second conductive members 55 and 61 are formed to have a breakdown voltage greater than the breakdown voltage of the primary arc gap 53 so long as the hermetic sealing of the gas tube 41 is maintained. Upon failure of the hermetic seal of the gas tube 41, the breakdown voltage of the secondary arc gaps becomes less than the breakdown voltage of the primary arc gap 53. Thus, spark gap protection is provided even though failure of the gas tube 41 is encountered.

Additionally, a prolonged overcurrent condition on the line, for example, will cause excessive heat in an amount sufficient to cause the solder pellet 39 to melt. Thereupon the compression spring 29 will exert a force on the planar portion 33 of the cage member 31 in an amount sufficient to cause the cage member 31 to move forward and the arcuate end portions 37 to contact the metallic contact member 15. As a result, a direct connection from the line contact member 15 to the grounded tubular housing member 19 is provided.

Thus, there has been provided a primary arc gap with parallel-connected secondary arc gaps whereby redundant protection of associated electrical apparatus is provided. Also, the protection is provided even when failure of the gas-filled tube occurs and even though it is unknown that the gas tube has failed. Moreover, the solder pellet provides still more protection should an overcurrent condition exist for an extended period of time. Importantly, the secondary arc gap protection utilizes added environmental inhibiting structures whereby ambient contaminents are eliminated or at least reduced.

While there has been shown and described what is at present considered the preferred embodiments of the invention, it will be obvious to those skilled in the art that various changes and modifications may be made therein without departing from the invention as defined by the appended claims. For example, some applications may not employ a solder pellet 39, whereupon the contact means within the cage for engaging the first electrode 43 would be planar portion 33.

What is claimed is:

1. A surge voltage arrester assembly comprising:
a metallic tubular housing member;
an electrically conductive cage positioned within said housing member and having outwardly extending resilient fingers slideably engaging said housing member;
electrically conductive contact means within said electrically conductive cage;
a hermetically sealed cold cathode gas tube with first and second electrodes spaced by an electrical insulator forming a primary arc gap, said cold cathode gas tube being positioned within said cage with said first electrode contacting said electrically conductive contact means;
a first electrically conductive member contacting said second electrode of said cold cathode gas tube within said electrically conductive cage, said first electrically conductive member having an axially extending protuberance;
centrally apertured electrical insulator means having a plurality of circumferentially spaced and isolated holes, said insulator means being telescoped over said axially extending protuberance of said first electrically conductive member and positioned adjacent said first conductive member;
a sleeve of electrical insulating material telescoped over said protuberance of said first electrically conductive member; and
a second electrically conductive member having a central aperture and telescoped over said sleeve of electrical insulating material, said second electrically conductive member being positioned immediately adjacent said electrical insulator means and retained by and contacting said resilient fingers within said electrically conductive cage whereby said circumferentially spaced holes provide secondary arc gaps intermediate said first and second electrically conductive members.

2. The surge voltage arrester assembly of claim 1 wherein said centrally apertured electrial insulator means and said sleeve of electrical insulating material are an integral unit.

3. The surge voltage arrester assembly of claim 1 wherein said centrally apertured electrical insulator means is of a diameter greater than the diameter of said first electrically conductive member whereby said resilient fingers of said electrically conductive cage are spaced from said first electrically conductive member by said centrally apertured electrical insulator means.

4. The surge voltage arrestor assembly of claim 1 wherein said circumferentially spaced and isolated holes of said insulator means provide air gaps intermediate said first and second electrically conductive members and said air gaps are sealed from exterior contaminants.

5. The surge voltage arrester of claim 1 wherein said outwardly resilient fingers of said electrically conductive cage member contact and support said second electrically conductive member and maintain said second electrically conductive member in contact with said apertured electrical insulator means, said apertured electrical insulator means in contact with said first electrically conductive member and said first electrically conductive member in contact with said second electrode of said cold cathode gas tube.

6. The surge voltage arrestor assembly of claim 1 wherein said plurality of isolated holes forming secondary arc gaps of said assembly are electrically in parallel with said primary arc gap of said cold cathode gas tube.

7. The surge voltage arrester assembly of claim 1 wherein said electrical insulator means comprises a plastic wafer of a thickness of about 0.008 to 0.010 inch intermediate said first and second electrically conductive members.

8. The surge voltage arrester assembly of claim 1 wherein said secondary arc gaps of said electrical insulator means have a breakdown voltage greater than the breakdown voltage of said primary arc gap of said hermetically sealed cold cathode gas tube and less than the breakdown voltage of said primary arc gap upon failure of said gas tube hermetic seal.

* * * * *

UNITED STATES PATENT AND TRADEMARK OFFICE

CERTIFICATE OF CORRECTION

PATENT NO. : 4,502,087

DATED : February 26, 1985

INVENTOR(S) : Jean-Marie Huvet

It is certified that error appears in the above-identified patent and that said Letters Patent are hereby corrected as shown below:

On the title page;

Page 1, please delete Assignee,"GTE PRODUCTS CORPORATION, Stamford Connecticut" and substitute therefore --Claude, S.A., Boulogne-Billancourt, France--.

Signed and Sealed this

*Sixteenth* Day of *July 1985*

[SEAL]

*Attest:*

DONALD J. QUIGG

*Attesting Officer* *Acting Commissioner of Patents and Trademarks*